US009400699B2

(12) United States Patent
Giraud et al.

(10) Patent No.: US 9,400,699 B2
(45) Date of Patent: Jul. 26, 2016

(54) DATA COMMUNICATION BETWEEN MODULES (75) Inventors: Jérôme Giraud, Caen (FR); Julien Van Den Bossche, Benouville (FR)

(73) Assignee: Orange, Paris (FR)

( * ) Notice: Subject to any disclaimer, the term of this patent is extended or adjusted under 35 U.S.C. 154(b) by 437 days.

(21) Appl. No.: 13/812,338

(22) PCT Filed: Jul. 21, 2011

(86) PCT No.: PCT/FR2011/051762
§ 371 (c)(1),
(2), (4) Date: Mar. 12, 2013

(87) PCT Pub. No.: WO2012/013893
PCT Pub. Date: Feb. 2, 2012

(65) Prior Publication Data
US 2013/0166524 A1    Jun. 27, 2013

(30) Foreign Application Priority Data
Jul. 28, 2010    (FR) ...................... 10 56220

(51) Int. Cl.
*G06F 17/30* (2006.01)
*G06F 9/54* (2006.01)
*H04L 29/08* (2006.01)

(52) U.S. Cl.
CPC    *G06F 9/54* (2013.01); *G06F 9/546* (2013.01); *G06F 17/30899* (2013.01); *H04L 67/02* (2013.01); *H04L 67/34* (2013.01); *G06F 17/30864* (2013.01); *G06F 17/30867* (2013.01)

(58) Field of Classification Search
None
See application file for complete search history.

(56) References Cited

U.S. PATENT DOCUMENTS

| 7,346,649 | B1  |   | 3/2008  | Wong          |             |
|-----------|-----|---|---------|---------------|-------------|
| 8,074,261 | B2  | * | 12/2011 | Murphy        | G06F 21/34  |
|           |     |   |         |               | 705/70      |
| 8,438,289 | B1  | * | 5/2013  | Grieve et al. | 709/227     |
| 8,447,643 | B2  | * | 5/2013  | Barnes, Jr.   | 705/7.29    |
| 2003/0126139 | A1 | * | 7/2003 | Lee          | G06F 17/2247 |
| 2007/0256003 | A1 |   | 11/2007 | Wagoner et al. |           |
| 2008/0098101 | A1 |   | 4/2008  | Black et al.  |             |
| 2008/0294716 | A1 |   | 11/2008 | Couvreur      |             |

(Continued)

FOREIGN PATENT DOCUMENTS

EP    2 169 569 A1    3/2010
WO    Wo 2004/010322 A1    1/2004

(Continued)

*Primary Examiner* — Cheryl Lewis
*Assistant Examiner* — Raheem Hoffler
(74) *Attorney, Agent, or Firm* — Drinker Biddle & Reath LLP (57) ABSTRACT A method is proposed for exchanging a data set between a transmitting module, associated with a first domain, and a destination module associated with a second domain. The transmitting module and the destination module are adapted to be loaded into a browser module having access to a local database for recording data and accessing the data recorded by one or more modules belonging to a single browsing domain and to any module loaded in the browser module that is also associated with said single browsing domain. The method comprises the following steps: storage, by a storage module associated with a third domain, of the data set in the local database; requesting a receiving module, associated with the third browsing domain, to read the data set; reading, by the receiving module, of the data set in the local database.

14 Claims, 4 Drawing Sheets

(56) References Cited

U.S. PATENT DOCUMENTS

| | | |
|---|---|---|
| 2009/0037517 A1 | 2/2009 | Frei |
| 2009/0083860 A1* | 3/2009 | Nathan et al. ............... 726/28 |
| 2009/0327421 A1 | 12/2009 | Fu et al. |
| 2010/0118038 A1* | 5/2010 | Labour et al. ............. 345/522 |

FOREIGN PATENT DOCUMENTS

| | | |
|---|---|---|
| WO | WO 2007/047765 A2 | 4/2007 |
| WO | WO 2009/018375 A1 | 2/2009 |
| WO | WO 2009/029404 A2 | 3/2009 |

* cited by examiner

DATA COMMUNICATION BETWEEN MODULES

CROSS-REFERENCE TO RELATED APPLICATIONS

This application is the U.S. national phase of the International Patent Application No. PCT/FR2011/051762 filed Jul. 21, 2011, which claims the benefit of French Application No. 1056220 filed Jul. 28, 2010, the entire content of which is incorporated herein by reference.

FIELD

The present invention generally relates to data communication between modules and more particularly to the local exchange of data between web pages loaded in a single browser.

BACKGROUND

At present many services are available to a user by the intermediary of web applications, whose pages are accessible by means of a browser. It would be particularly advantageous to share the user's information efficiently between the pages of several web applications, notably when the latter are hosted in different domains. A web page belonging to the "www.abc.fr" domain could thus usefully exploit, for example by displaying it in an adapted form, a part of the data, specific to the user, collected by another web page belonging to the "www.def.net" domain.

Typically such data communication between modules can only be implemented by sharing access to common databases. This approach is not however satisfactory, notably when the pages are hosted in different domains and are used by various users. In fact, a third party entity must then intervene, which notably raises problems of performance, configuration, security and adaptability.

There is therefore a need to share data between the web pages of a plurality of web applications, notably when the latter belong to different domains, without having recourse to a remote entity, that is to say located outside of the computer used for accessing said web pages.

SUMMARY

The purpose of the present invention is to improve the situation.

According to a first aspect, there is proposed a method for transmitting a data set from a transmitting module to a destination module. The transmitting module is associated with a first browsing domain. The destination module is associated with a second browsing domain. The transmitting module and the destination module are adapted to be loaded into a browser module. The browser module has access to a local database designed to allow:

data recording to each module loaded into the browser module; and,
  access to the data recorded by one or more modules associated with a single browsing domain, to any module loaded into the browsing module also associated with said single browsing domain.

The method comprises the following steps:

loading, by the browser module, a first web page belonging to the first browsing domain and of the transmitting module;

loading, by the browser module, of a storage module associated with a third browsing domain with which is also associated a receiving module adapted to allow the destination module to access the local database, the loading of the storage module being provoked by the presence in the first web page of a reference to the third browsing domain;

storage by the storage module of the data set in the local database.

The browser module has a secure local storage mode, since access to the data stored in the database is only authorized to the modules associated with the same domain as the module which carried out the recording of said data. Such a local storage mode is notably proposed in the web browsers supporting the "HTML5" standard described in the document "HTML5—A vocabulary and associated APIs for HTML and XHTML", W3C Working Draft, 4 Mar. 2010. The transmitting module, which is for example a script associated with a web page belonging to the first domain, cannot therefore record the data set directly in the database so that the latter is accessible to a destination module, associated for example with a web page belonging to a second domain, separate from the first domain. That is why the transmitting module uses a storage module associated with a third domain in order to record the data set in the local database. The destination module uses the receiving module, associated with this third domain, in order to access the local database. The data set can thus be shared between the transmitting module and the destination module, with total security, by the intermediary of the storage and receiving modules associated with the same domain. The sharing of the data set does not therefore necessitate the use of a third party entity located outside of the browser module. Moreover, as the data set is stored locally, no exchange of data, which is costly in time and bandwidth, is necessary. Moreover, the method can be implemented by using the functionalities provided by the browser module.

In one embodiment, the transmitting module dynamically inserts said reference into the first web page.

In one embodiment, said reference is a reference to a second web page, containing the code of the storage module, intended to be downloaded and then interpreted by the browser module. The second web page can notably belong to the third browsing domain, or the data set to be transferred can be extracted from the first web page.

According to a second aspect, there is proposed a method of receiving, by a destination module, a data set transmitted by a transmitting module. The transmitting module is associated with a first browsing domain. The destination module is associated with a second browsing domain. The transmitting module and the destination module are adapted to be loaded into a browser module. The browser module has access to a local database designed to allow:

recording of data to each module loaded in the browser module; and,
  access to the data recorded by one or more modules associated with a single browsing domain, to any module loaded in the browsing module also associated with said single browsing domain.

The method comprises the following steps:

loading, by the browser module, of a first web page belonging to the second browsing domain, and of the destination module;

loading, by the browser module, of a receiving module associated with a third browsing domain with which is also associated a storage module adapted to allow the transmitting module to access the local database, the loading of the receiving module being provoked by the presence in the first web page of a reference to the third browsing domain;

reading by the receiving module of the received data set in the local database.

In one embodiment, the destination module dynamically inserts said reference into the first web page.

In one embodiment, said reference is a reference to a second web page containing the code of the storage module, intended to be downloaded and then interpreted by the browser module. The second web page can belong to the third browsing domain or the data set to be transferred can be extracted from the first web page.

According to a third aspect, there is proposed a browsing device for the implementation of a method for transmitting a data set from a transmitting module to a destination module. The transmitting module is associated with a first browsing domain. The destination module is associated with a second browsing domain. The browser device comprises a browser module having access to a local database designed to allow:

recording of data to each module loaded in the browser module; and, access to the data recorded by one or more modules associated with a single browsing domain, to any module loaded in the browser module also associated with said single browsing domain.

The browser module comprises:

means of loading a first web page, belonging to the first browsing domain, and the transmitting module;

means of loading a storage module designed to store the data set in the local database, the storage module being associated with a third browsing domain with which there is also associated a receiving module adapted to allow the destination module to access the local database, the loading of the storage module being initiated by the presence in the first web page of a reference to the third browsing domain.

According to a fourth aspect, there is proposed a browser device for the implementation of a method for receiving, by a destination module, a data set transmitted by a transmitting module. The transmitting module is associated with a first browsing domain. The destination module is associated with a second browsing domain. The browser device comprises a browser module having access to a local database designed to allow:

recording of data to each module loaded in the browser module; and, access to the data recorded by one or more modules associated with a third browsing domain, to any module loaded in the browser module also associated with said single browsing domain.

The browser module comprises:

means of loading a first web page, belonging to the second browsing domain, and of the destination module;

means of loading a receiving module, designed to read the data set received in the local database and associated with a third browsing domain with which is also associated a storage module designed to allow the transmitting module to access the local database, the loading of the receiving module being initiated by the presence in the first web page of a reference to the third browsing domain.

In a particular embodiment, the different steps of the method according to the first, second and fifth aspects are determined by instructions of computer programs.

Consequently, the invention also relates to computer programs on a data medium, these programs being able to be used respectively in a terminal or, more generally, in a computer, these programs respectively comprising instructions adapted for the implementation of the different steps of the methods which have just been described.

These programs can use any programming language and can be in the form of source code, object code or of intermediate code between source code and object code, such as in a partially compiled form, or in any other desirable form.

The invention also relates to a data medium readable by a computer and comprising computer program instructions such as mentioned above.

The data medium can be any entity or device capable of storing the program. For example, the medium can comprise a storage means, such as a ROM, for example a CD ROM or a microelectronic circuit ROM, or a magnetic recording means, for example a floppy disk or a hard disk.

On the other hand, the data medium can be a transmissible medium such as an electric or optical signal, which can be conveyed via an electric or optical cable, by radio or by other means. The program according to the invention can in particular be downloaded on a network of the internet type.

Alternatively, the data medium can be an integrated circuit in which the program is incorporated, the circuit being adapted to execute or to be used in the execution of the methods in question.

BRIEF DESCRIPTION OF THE DRAWINGS

Other aspects, objectives and advantages of the invention will become apparent on reading the description of one of its embodiments.

The invention will also be better understood with the help of the drawings, in which.

DETAILED DESCRIPTION

Figure 1:
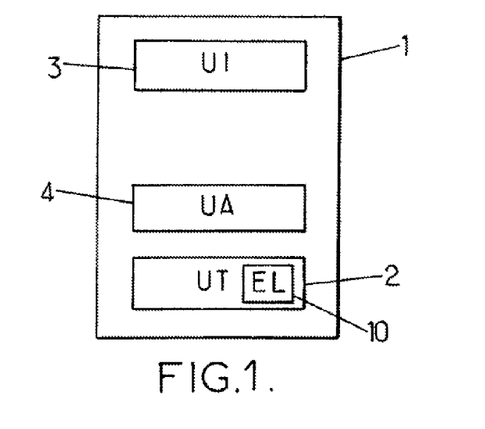
FIG. 1 is a block diagram of a terminal.

In this description, and as shown in FIG. 1, a terminal 1 is considered, comprising a processing unit 2 and a user interface 3. The terminal 1 comprises a network access unit 4. The processing unit 2 comprises calculation and storage means for implementing a software environment 10. The software environment 10 is typically formed by autonomous micro-software, or "firmware" in English, of a start-up manager, or "boot loader" in English, of an operating system comprising software components. By way of non-limiting example, the operating system can be an operating system for a mobile terminal. The user interface 3 allows the user to interact with the terminal 1. The network access unit 4 for example allows the terminal 1 to access the internet via various communications networks, such as for example a mobile telephone network, a data processing network or a satellite network. The terminal 1 is typically an item of portable mobile equipment such as a mobile telephone or a computer.

Figure 2:
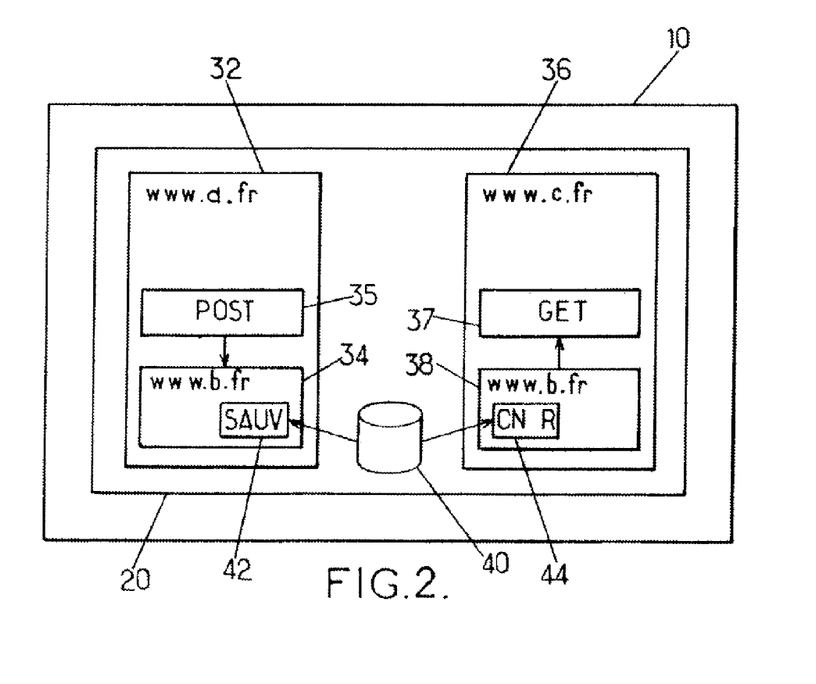
FIG. 2 is a block diagram of a software environment, comprising a browser module adapted to load a first and a second browsing context, according to one embodiment.

As shown in FIG. 2, the software environment 10 is adapted to execute a browser module 20. The browser module 20 notably has the function of allowing a user to access and interact with a set of pages of an application. More particularly, the browser module 20 makes it possible to download web pages implementing a web application, these pages belonging to a browsing domain and being provided by a management server of the browsing domain in question. The browser module 20 comprises for this purpose at least one client able to communicate according to the hypertext transfer protocol or HTTP (for the English expression "HyperText Transfer Protocol") with a remote HTTP server. Such pages are for example described in hypertext markup language or HTML (for the English expression "HyperText Markup Language"). Page formatting data, called style sheets, usually encoded in CSS (Cascading Style Sheet) format, are attached to this page encoded in HTML. The HTML page furthermore contains (or is transmitted with) program codes, usually in the form of Javascript, intended to be interpreted and executed by the browser module during the loading of the page.

The browser module 20 thus comprises an engine to interpret the HTML code, the formatting data and the program codes in order to execute the functions encoded by the program codes and then to generate, format and display the downloaded web pages.

The browsing domain concept is to be interpreted in a wide manner: it is a matter of a web page or pages having the same domain name, for example all of the pages whose URL contains www.xxxx.fr and/or www.xxxx.com and/or bbb.xxxx.com, where "xxxx" represents the name of the domain in question.

Furthermore, the terms "local" and "locally" are to be considered with respect to the browser module 20 and its components. Thus an item of data stored locally corresponds, in the rest of this document, to an item of data directly accessible by the browser module 20, without calling upon either a remote entity out of the software environment 10 such as a remote web server, or upon an entity executed in the software environment 10 but supported by processes not initiated by the browser module 20, such as a database server executed in the software environment in a process not belonging to the browser module 20.

In the rest of the description, the references to the HTML language refer to the HTML5 language specified in the standard "HTML5—A vocabulary and associated APIs for HTML and XHTML", W3C Working Draft, 4 Mar. 2010.

This document notably defines the "browsing context" concept as being an environment in which a document is presented to the user. For example, each window or each tab of a browser presents a browsing context to the user and serves to present a succession of documents or web pages to that user.

Figure 4A:
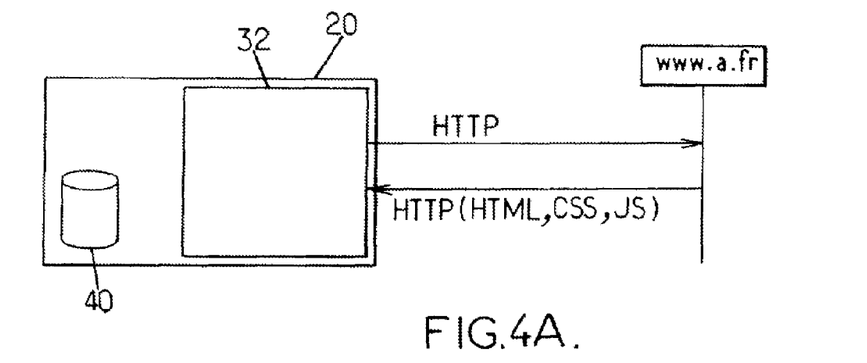
FIGS. 4a, 4b, 4c, 4d, 4e and 4f are block diagrams showing a browser module.

In the example shown in FIG. 2 and in FIG. 4A, the browser module 20 presents the user with a first browsing context 32: the browser module 20 transmits an HTTP request to a first web domain management server and on return downloads at least a first page. This first page is written, at least partially, in HTML language and belongs to a first domain "www.a.fr". This first page implements a first web application.

On receiving this first page, the browser module 20 interprets the HTML code describing this first page.

Program codes of a data transmitting module 32 are included in this first page or are transmitted by the management server of this first domain with this first page. This transmitting module is loaded and executed by the browser module 20, that is to say that the program codes of the transmitting module are loaded into memory, interpreted and executed by the browser module.

The user can interact conventionally with the first page, in particular in order to acquire knowledge of the information presented, to communicate new data, for example using forms, or to request the first web application to execute certain tasks.

According to a first alternative embodiment of the invention, this first page furthermore contains a reference to a second browsing domain.

According to a second alternative embodiment of the invention, the transmitting module dynamically inserts a reference to a second browsing domain into the first page. The first page contains this reference after this insertion.

In the first or the second alternative, the reference to the second browsing domain is encoded in the HTML page by means of an XML tag, of the "iframe" type, such as defined in the HTML5 standard, containing at least one identification of a web page ("src" attribute in the HTML5 standard), in URL form for example.

Figure 4B:
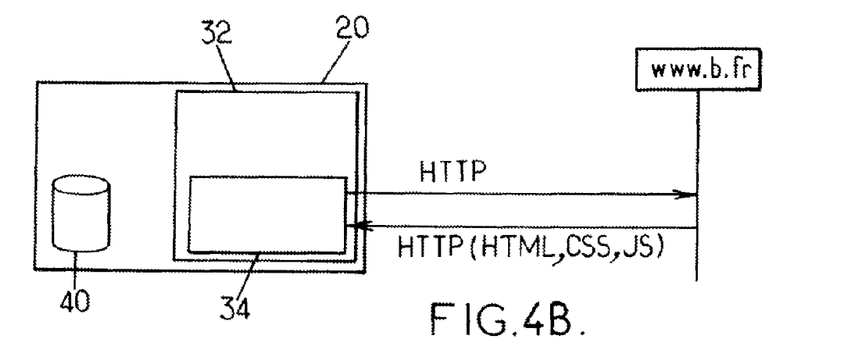

As shown in FIG. 4B, such a reference serves to instantiate a browsing sub-context: its presence in the first web page provokes the transmission, by the browser module 20, of an HTTP request (FIG. 4B) to the management server of this second browsing domain and the loading by the browser module 20 of a second web page belonging to this second domain, on this occasion the page identified in the tag.

This reference is for example in the following form:
<iframe src=« www.b.fr/page1» ></iframe>
where "www.b.fr" identifies the second browsing domain.

Such a reference incorporates one web page in another by means of reference.

The second page is written, at least partially, in HTML language.

Program codes of a data storage module 34 are included in this second page or are transmitted by the management server of this second domain with the HTML data of this second page. This storage module 34 is loaded and executed by the browser module 20, that is to say that the program codes of the storage module are loaded into memory, interpreted and executed by the browser module.

It should be noted that the second page does not necessarily comprise information to be presented to the user and may not therefore be displayed. In fact, in this case, the presentation of the first page is not modified by the presence of the "iframe" reference. Conversely, provision could be made for the presentation of the first page to be modified, for example by adding a logo or another sign, indicating the possibility of transmitting data contained in this first page to another web page.

The first page furthermore comprises a data set A to be saved locally. These data can be data integrated in the HTML page transmitted to the browser module and/or data having been entered in this first page by a user.

Figure 4C:
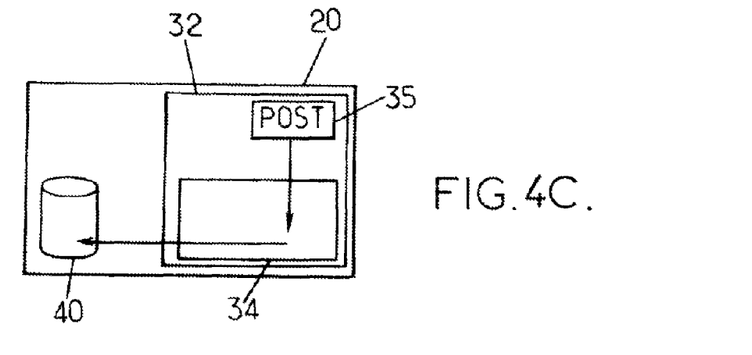

As shown in FIG. 4C, the transmitting module 32 comprises a transfer module 35 adapted to transfer the data set A to the storage module 34 associated with the second page belonging to the second domain. For this purpose, the transfer module 35 dialogs by means of the HTTP protocol with the storage module 34 in order to transfer the data set A to it.

The storage module 34 therefore receives the data set A to be recorded from the transfer module 35. The storage module comprises a sub-module, called the local back-up module 42, designed to access the local database 40 and adapted to record data locally in the local database 40. Thus, on receiving the data set A, the local back-up module 42, associated just like the storage module 34 with the second domain, can save the data set A locally, using a local database 40 comprised in the browser module 20. The local database 40 is adapted for storing data in a persistent manner within the browser module 20. In particular, the local database 40 implements an interface conforming with the W3C specification entitled "Web Storage", notably in its "Editor's Draft" version of 14 Apr. 2010.

The local database 40 is configured to:
allow any module loaded in the browser module to record data;
authorize access to the data recorded by one or more modules associated with a browsing domain, solely to a module loaded in the browser module also associated with said same browsing domain.

Thus, access to the data stored by the storage module 34 will only be authorized for software modules whose program codes are contained in or associated with a page belonging to the second domain, or possibly to a sub-domain of that second domain. Thus, in the example shown in FIG. 2, the data set A having been recorded in the local database 40 by the storage module 34 associated with the second page belonging to this second domain, only the software modules whose program codes are contained in or associated with this second domain, or possibly with a sub-domain of the second domain, such as for example "bbb.b.fr", can access the data set A via the local database 40. In particular, no module associated with the first page belonging to the first domain "www.a.fr" can request the extraction of the stored data set A from the local database 40.

Figure 4D:
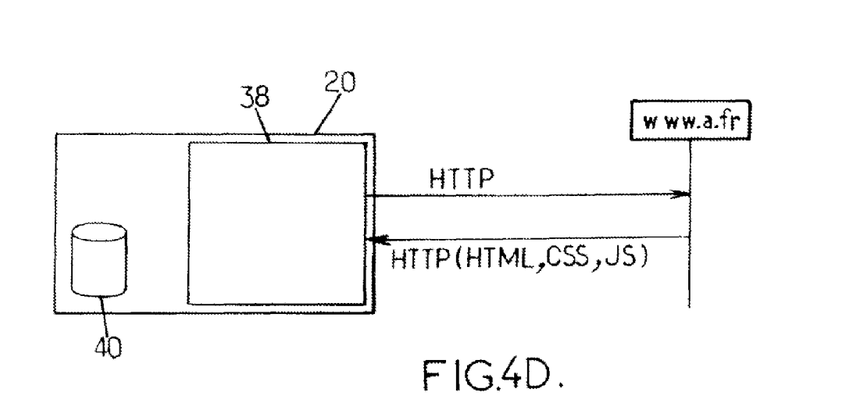

As shown in FIG. 4D, the browser module 20 presents the user with a second browsing context 36: the browser module transmits an HTTP request to a second web domain management server and on return downloads at least a third page. This third page is written, at least partially, in HTML language, and belongs to a third domain, for example "www.c.fr". This third page implements a second web application in cooperation with the management server of this third domain.

The user can interact conventionally with the second page, in particular in order to obtain knowledge of the information presented, to communicate new data, for example using forms, or to request the execution of certain tasks by the first web application.

In FIG. 2, for the sake of clarity, the browser module 20 is shown containing the first and the second browser contexts simultaneously. This case can arise notably when the browser module supports the consultation of a plurality of browsing contexts simultaneously (for example in the form of a plurality of tabs each comprising a different browsing context) and when the user simultaneously accesses the first web application and the second web application. However, this example is in no way limitative. In particular, the user can just as well use the browser module 20 for, initially, accessing the first web page and then, after having left the latter, secondly accessing the second web application. Thus, in this example, the browser module 20 comprises only a single browsing context at a given time.

On receiving this third page, the browser module 20 interprets the HTML code describing this third page.

Program codes of a destination data module 36 are included in this third page or are transmitted by the management server of this third domain with this third page. This destination module 36 is loaded and executed by the browser module 20, that is to say that the program codes of the module are loaded into memory, interpreted and executed by the browser module.

According to a first alternative embodiment of the invention, this third page furthermore contains a reference to the second browsing domain.

According to a second alternative embodiment of the invention, the destination module 36 dynamically inserts a reference to the second browsing domain into the third page.

In the first or the second alternative, the reference to the second browsing domain is coded in the HTML page by means of an XML tag, of the "iframe" type, such as defined in the HTML5 standard, containing at least one web page identification ("src" attribute in the HTML5 standard), in URL form for example.

Figure 4E:
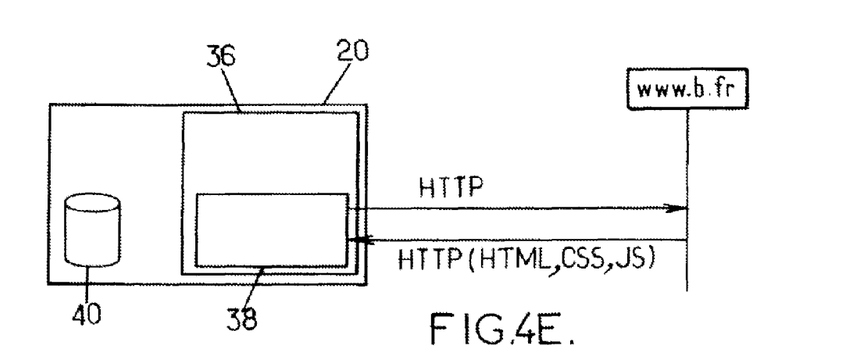

As shown in FIG. 4E, such a reference serves to instantiate a sub-browsing context: its presence in the third web page provokes the transmission, by the browser module 20, of an HTTP request to the management server of this second browsing domain and the loading by the browser module 20 of a fourth web page belonging to this second domain, in this case the page identified in the tag.

This reference is for example in the following form:
<iframe src="« www.b.fr/page2 »" ></iframe>
where "www.b.fr" identifies the second browsing domain.

The fourth page is written, at least partially, in HTML language. Program codes of a data receiving module 38 are included in this fourth page or are transmitted by the management server of this second domain with the HTML data of this fourth page. This receiving module 38 is loaded and executed by the browser module 20, that is to say that the codes of programs of the receiving module 38 are loaded into memory, interpreted and executed by the browser module 20.

It should be noted that the fourth page does not necessarily comprise information to be presented to the user and may not therefore be displayed. In fact in this case the presentation of the third page is not modified by the presence of the "iframe" reference. Conversely, provision could be made for the presentation of the third page to be modified, for example by adding a logo or another sign, indicating the possibility of receiving data contained in another web page in this third page.

Figure 4F:
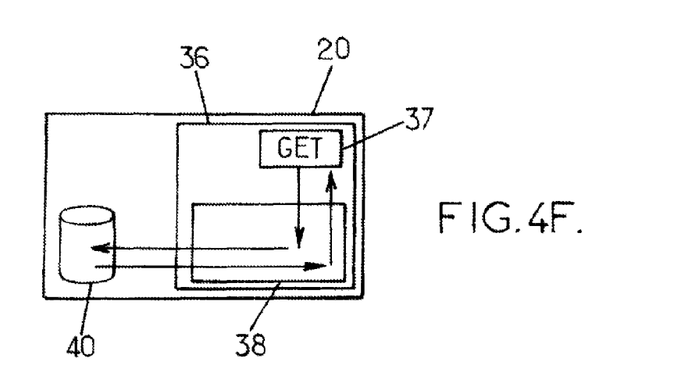

The third page is used for example to present the locally saved data set A to the user. For this purpose, the destination module 36 comprises a reader module 37 adapted for requesting the receiving module 38 to read the data set A, associated with the fourth page and with the second domain. As shown in FIG. 4F, the reader module 37 dialogs by means of the HTTP protocol with the receiving module 38 in order to receive the data set A.

The receiving module 38 therefore receives from the reader module 37 a request to read the data set A. The receiving module 38 comprises a sub-module, called the local loading module 44, designed to access the local database 40 and adapted to obtain data stored in the local database 40. Thus, on interrogation of the local database 40, the local loading module 44, associated with the second domain just like the receiving module, can locally access the data set A, using the local database 40 included in the browser module 20. The local loading module 44 transfers the data set A to the receiving module 38. The reader module 37 then receives the requested data set A from the receiving module 38. As the local database 40 is configured to allow the reading of the recorded data only at the request of modules associated with the same domain, or possibly with a sub-domain of the latter, the third page cannot directly access the data set A stored by the local database 40.

A case of use will now be described by way of non-limitative example. A user of the terminal 1, for example a mobile telephone, uses the browser module to access a web site of the "www.abc.com" domain, in order to listen to music. The user adds the welcome page of said site to a list of favorite sites of the browser module in order to have a link to this welcome page that is directly accessible after loading the browser module. The welcome page then detects the addition of the site to the list of favorites. As the welcome page incorporates by reference a web page hosted in the "www.xyz.com" domain, it requests the latter to store in the local database an item of information indicating that the welcome page of the web site "www.abc.com" has been added to the list of favorites. Later, the user uses the browser module to access the web site of the "www.def.com" domain. As the welcome page incorporates by reference a web page hosted in the "www.xyz.com" domain, it requests the latter to read an item of information in the local database indicating if the welcome page of the web site "www.abc.com" has been added to the list of favorites. Depending on the result obtained, the welcome page can adapt its content in accordance with the extracted information.

Another case of use will now be described by way of non-limitative example. A user of the terminal 1, for example a mobile telephone, uses the browser module to access a web site of the "www.abc.com" domain in order to publish messages. Via a web page incorporated by reference and hosted in the "www.xyz.com" domain, each message, after it has been sent, is stored in the local database. Later, the user uses the browser module to access a web site of the "www.def.com" domain of the social network type. Via a web page incorporated by reference and hosted in the "www.xyz.com" domain, the previously recorded messages can be displayed, for example in a page describing the user's profile.

Figure 3:
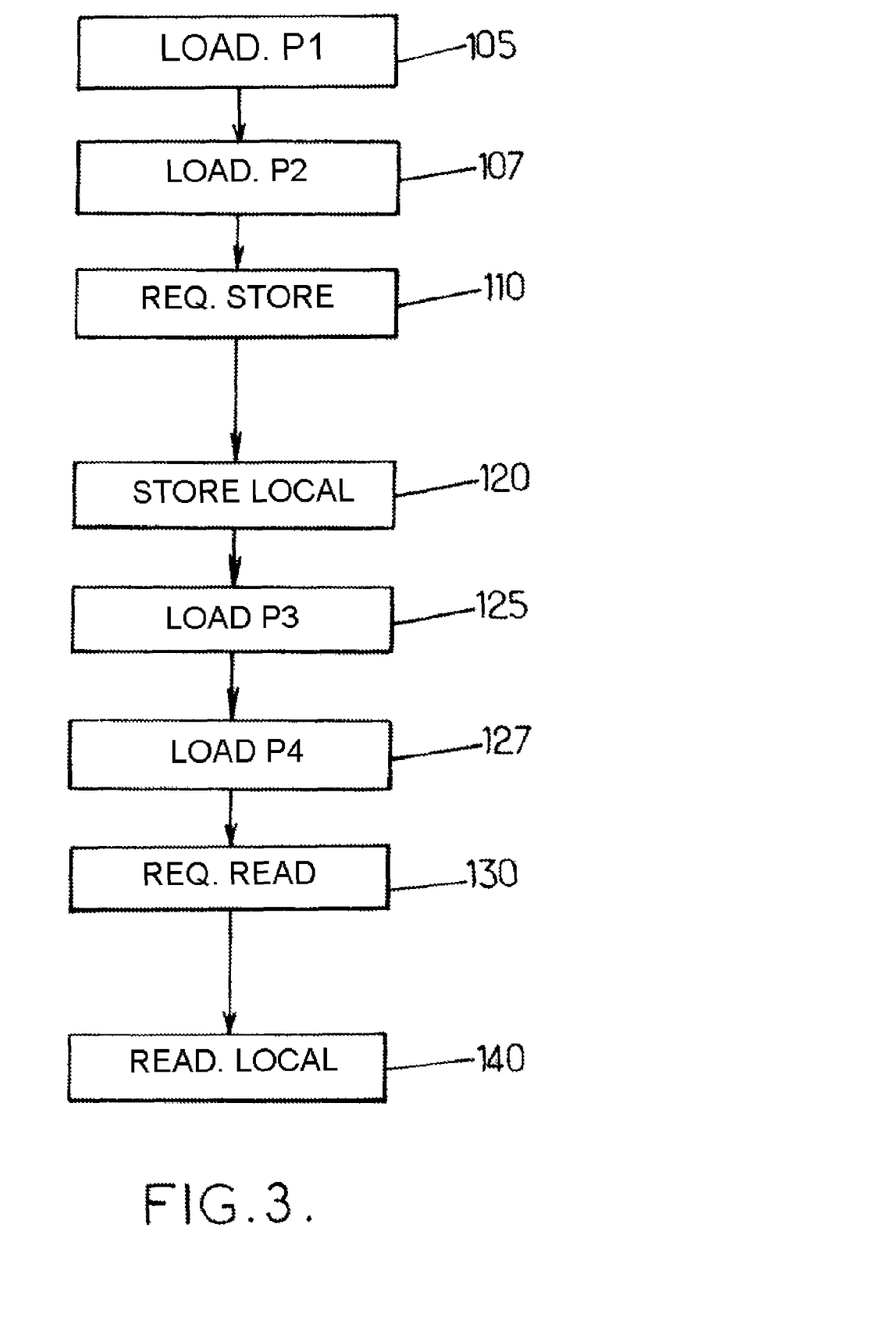
FIG. 3 is a flowchart showing the principal steps of a data communication method according to one embodiment.

A data communication method according to one embodiment, shown in FIG. 3, will now be described. In this example, a data set A is transmitted, from a first web page of a first web application, to at least a third web page of a second web application. The first and the third web pages are hosted in a first and in a third domain respectively. The first web page incorporates by reference a second web page hosted in a second domain. The third web page incorporates by reference a fourth web page also hosted in the second domain.

In a step 105 shown in detail in FIG. 4*a*, the first page is loaded into a browser having a local database allowing:
    the recording of data by a web page; and,
    the reading of said data by web pages belonging to the same domain as that to which the web page having carried out the recording of said data belongs.

A transmitting module 32 associated with this first page is also loaded by the browser.

In a step 107 shown in detail in FIG. 4*b*, the second web page, which is incorporated by reference in the first page, is loaded into the browser because of the presence of this reference in the first web page. A storage module 34 associated with this first page is also loaded by the browser.

Then, in a step 110 shown in detail in FIG. 4*c*, the transmitting module 32 transmits a request to store the data set A to the storage module 34.

In a step 120 shown in detail in FIG. 4*c*, the storage module 34 stores the data set A locally, in the local database of the browser.

In a step 125 shown in detail in FIG. 4*d*, the third web page is loaded into the browser together with a destination module 36 associated with this third page.

In a step 127 shown in detail in FIG. 4*e*, the fourth web page, which is incorporated by reference in the third page, is loaded into the browser because of the presence of this reference in the third web page. A receiving module 38 associated with this first page is also loaded by the browser.

In a step 130 shown in detail in FIG. 4*f*, the destination module 36 transmits a request to read the data set A to the receiving module 38.

In a step 140 shown in detail in FIG. 4*f*, the receiving module 38 reads the data set A in the local database and transmits it to the destination module 36.

The invention claimed is:

1. A method for transmitting a data set from a transmitting module to a destination module, the transmitting module being associated with a first browsing domain, the destination module being associated with a second browsing domain different from the first browsing domain, the transmitting module and the destination module being loaded into a browser module, the browser module having access to a local database with respect to said browser module, said local database allowing:
    any module loaded in the browser module to record data;
    access to the data recorded by one or more modules associated with a browsing domain, only to any module loaded into the browsing module also associated with said same browsing domain;
    the method comprising the following steps:
        loading, by the browser module, of a first web page belonging to the first browsing domain and of the transmitting module;
        loading, by the browser module, of a storage module associated with a third browsing domain different from the first and second browsing domains, said third browsing domain also being associated with a receiving module, said receiving module allowing the destination module to access the local database, the loading of the storage module being provoked by the presence in the first web page of a reference to the third browsing domain;
        storage by the storage module of the data set in the local database.

2. The method as claimed in claim 1, wherein the transmitting module dynamically inserts said reference into the first web page.

3. The method as claimed in claim 1, wherein said reference is a reference to a second web page, containing the code of the storage module, downloaded and then interpreted by the browser module.

4. The method as claimed in claim 3, wherein the second web page belongs to the third browsing domain.

5. The method as claimed in claim 3, wherein the data set to be transferred is extracted from the first web page.

6. A non-transitory computer program product comprising instructions for implementing the method as claimed in claim 1 when the program is executed by a computer.

7. A data medium, readable by a computer, and comprising instructions of a computer program as claimed in claim 6.

8. A method of receiving, by a destination module, a data set transmitted by a transmitting module, the transmitting module being associated with a first browsing domain, the destination module being associated with a second browsing domain different from the first browsing domain, the transmitting module and the destination module being loaded into a browser module, the browser module having access to a local database with respect to said browser module, said local database allowing:
    any module loaded in the browser module to record data; and,
    access to the data recorded by one or more modules associated with a browsing domain, only to any module loaded in the browsing module also associated with said same browsing domain;
    the method comprising the following steps:
        loading, by the browser module, of a first web page belonging to the second browsing domain, and of the destination module;
        loading, by the browser module, of a receiving module associated with a third browsing domain different from the first and second browsing domains, said third browsing domain also being associated with a storage module, said storage module allowing the transmitting module to access the local database, the loading of the receiving module being provoked by the presence in the first web page of a reference to the third browsing domain;

reading by the receiving module of the received data set in the local database.

9. The method as claimed in claim 8, wherein the destination module dynamically inserts said reference into the first web page.

10. The method as claimed in claim 8, wherein said reference is a reference to a second web page containing the code of the storage module, downloaded and then interpreted by the browser module.

11. The method as claimed in claim 10, wherein the second web page belongs to the third browsing domain.

12. The method as claimed in claim 10, wherein the data set to be transferred is extracted from the first web page.

13. A user terminal comprising a browser device operable on a hardware processor of the user terminal for the implementation of a method for transmitting a data set from a transmitting module to a destination module, the transmitting module being associated with a first browsing domain, the destination module being associated with a second browsing domain different from the first browsing domain, the browser device comprising a browser module having access to a non-transitory local database with respect to said browser module, said local database allowing:

any module loaded in the browser module to record data in non-transitory storage of said local database; and, access to the data recorded by one or more modules, associated with a browsing domain, only to any module loaded in the browser module also associated with said same browsing domain;

wherein the browser module comprises:

a non-transitory memory and an engine for loading a first web page, belonging to the first browsing domain, and the transmitting module;

a non-transitory memory and an engine for loading a storage module for storing the data set in the local database, the storage module being associated with a third browsing domain different from the first and second browsing domains, said third browsing domain also being associated with a receiving module, said receiving module allowing the destination module to access the local database, the loading of the storage module being initiated by the presence in the first web page of a reference to the third browsing domain.

14. A user terminal comprising a browser device operable on a hardware processor of the user terminal for the implementation of a method for receiving, by a destination module, a data set transmitted by a transmitting module, the transmitting module being associated with a first browsing domain, the destination module being associated with a second browsing domain different from the first browsing domain, the browser device comprising a browser module having access to a non-transitory local database with respect to said browser module, said local database allowing:

any module loaded in the browser module to record data in non-transitory storage of said local database; and, access to the data recorded by one or more modules associated with a browsing domain, only to any module loaded in the browser module also associated with said same browsing domain;

wherein the browser module comprises:

a non-transitory memory and an engine for loading a first web page, belonging to the second browsing domain, and of the destination module;

a non-transitory memory and an engine for loading a receiving module for reading the data set received in the local database and associated with a third browsing domain different from the first and second browsing domains, said third browsing domain also being associated with a storage module, said storage module allowing the transmitting module to access the local database, the loading of the receiving module being initiated by the presence in the first web page of a reference to the third browsing domain.

\* \* \* \* \*